(12) United States Patent
Strekalov

(10) Patent No.: US 7,590,313 B1
(45) Date of Patent: Sep. 15, 2009

(54) PHASED-ARRAY OPTICAL WHISPERING GALLERY MODE MODULATION AND METHOD

(75) Inventor: Dmitry V. Strekalov, Arcadia, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 12/251,607

(22) Filed: Oct. 15, 2008

(51) Int. Cl.
*G02F 1/01* (2006.01)
*G02F 1/035* (2006.01)
*G02B 6/26* (2006.01)
*G02B 6/42* (2006.01)

(52) U.S. Cl. .................. 385/1; 385/2; 385/3; 385/31; 385/32

(58) Field of Classification Search .............. 385/1–3, 385/31, 32, 36, 37
See application file for complete search history.

(56) References Cited

U.S. PATENT DOCUMENTS

| 5,917,179 A | 6/1999 | Yao |
| 6,178,036 B1 | 1/2001 | Yao |
| 6,417,957 B1 | 7/2002 | Yao |
| 7,043,117 B2 | 5/2006 | Matsko et al. |
| 7,145,660 B2 * | 12/2006 | Margalit et al. ............. 356/477 |

OTHER PUBLICATIONS

"Proposed silicon wire interleaver structure," by Song et al, Optics Express, vol. 16, No. 11, May 26, 2008, pp. 7849-7859.*
"Waveguide-coupled AlGaAs/GaAs microcavity ring and disk resonators with high finesse and 21.6-nm free spectral range," by Rafizadeh et al, Optics Letters, vol. 22, No. 16, Aug. 15, 1997, pp. 1244-1246.*
"Hybrid InGaAsP-InP Mach-Zehnder racetrack resonator for thermooptic switching and coupling control," by Green et al, Optics Express, vol. 13, No. 5, Mar. 7, 2005, pp. 1651-1659.*
"Nested-ring Mach-Zehnder interferometer," by Darmawan et al, Optical and Quantum Electronics, vol. 38, Published online Jan. 6, 2007, pp. 1151-1157.*

* cited by examiner

*Primary Examiner*—Frank G Font
*Assistant Examiner*—Robert Tavlykaev
(74) *Attorney, Agent, or Firm*—Mark Homer

(57) ABSTRACT

A whispering gallery mode (WGM) resonator device and method capable of filtering sidebands of optical modulators are provided. The method includes providing an optical resonator adapted to support whispering gallery modes and forming a first field and a second field from a first location and a second location, respectively, at the circumference of the optical resonator and being separated by an arc angle, $\alpha$. The method includes adjusting relative phase between the first field and the second field in accordance to a differential phase, $\beta$, and combining the first and the second fields into an output. Particular selection of the arc angle, $\alpha$, and the differential phase, $\beta$, can determine the function of the output.

21 Claims, 4 Drawing Sheets

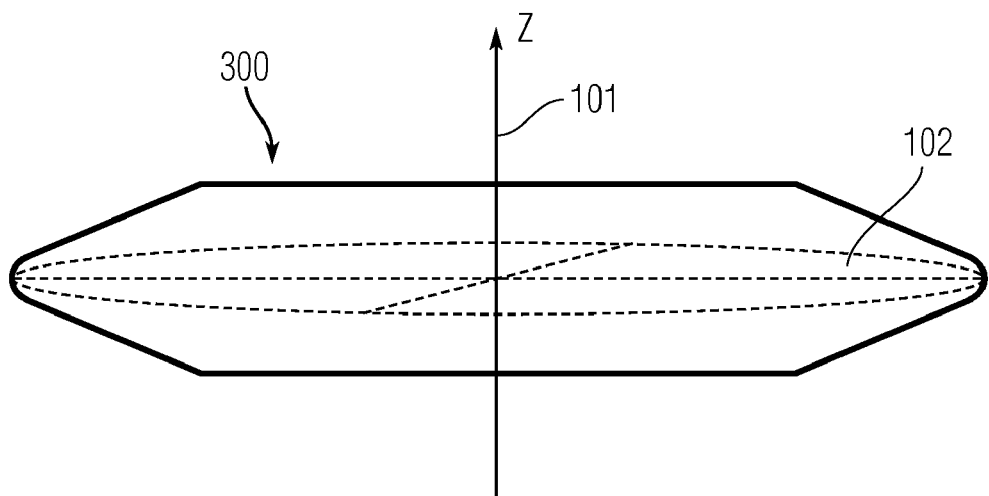
Fig. 3
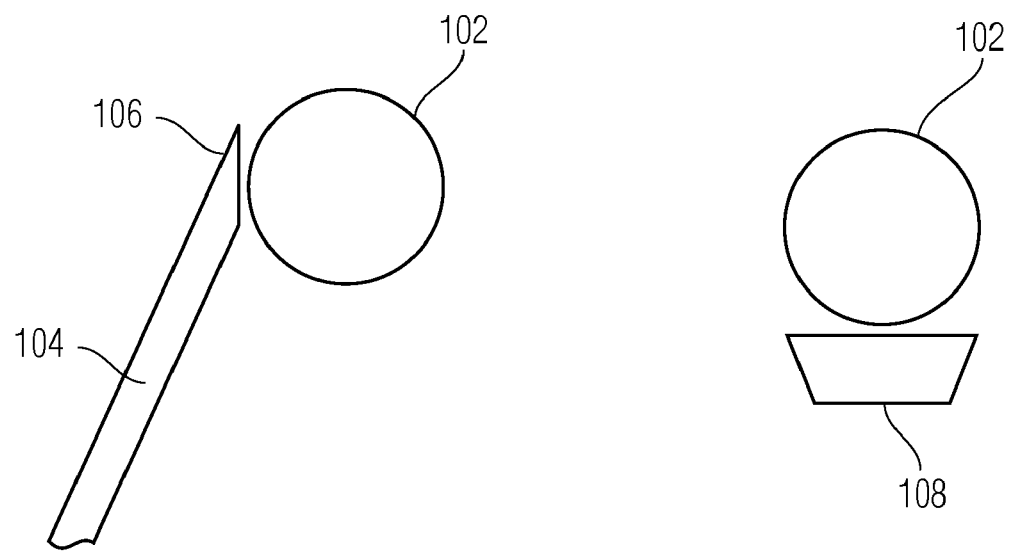
Fig. 4A
Fig. 4B

PHASED-ARRAY OPTICAL WHISPERING GALLERY MODE MODULATION AND METHOD

STATEMENT AS TO FEDERALLY-SPONSORED RESEARCH

The invention described herein was made in the performance of work under a NASA contract, and is subject to the provisions of Public Law 96-517 (U.S.C. 202) in which the Contractor has not elected to retain title.

FIELD OF THE INVENTION

The present teachings relate to a phased-array optical whispering gallery mode (WGM) modulator device, the filtering and conversion of phase to amplitude modulation in an optical WGM modulator device, and the suppression of high-order harmonics in an optical WGM modulator device. In particular, the present teachings relate to connecting phase variation of a field in an optical WGM resonator with the azimuthal angle between a pair of coupling locations on the optical WGM resonator.

BACKGROUND OF THE INVENTION

Optical modulators, and in particular, those capable of operating at high frequencies are the workhorses of telecom industry. They are also of great importance for space and military applications where optical high-speed links between ground and space, or between space-borne objects, are used. In the latter application, the size/mass and power budget parameters can be particularly important. One technique allowing for great performance with respect to these parameters, which has also found use in commercial applications, is the implementation of whispering gallery mode (WGM) configurations of optical modulators. Such optical modulators can operate at tens of GHz and have extremely low RF saturation power (less then 0 dBm).

A commonly known issue with respect to high-frequency modulators is that they are typically phase modulators, while it is the amplitude modulation which is desired for the majority of applications. The type of modulation depends on the relative phase of the beat notes between the carrier and both sidebands, so the phase/amplitude modulation conversion requires the ability to manipulate those phases. Furthermore, for many applications, it is highly desirable to eliminate one of the sidebands, thereby implementing a single side-band (SSB) modulator. Finally, it is sometimes useful to suppress higher-order harmonics, or to separate one or more sidebands from the optical carrier.

U.S. Pat. No. 7,043,117 to Matsko discloses a method of producing SSB modulators based on WGM optical resonators that have nonlinear optical materials in multiple sectors where nonlinear coefficients of two adjacent sectors are oppositely poled. In particular, non-equidistant modes of a WGM cavity are utilized in generating SSB modulation. These non-degenerate whispering gallery modes are produced in a WGM dielectric cavity that is fabricated from two crystal wafers with alternating directions of the crystal axis. Such crystals can be difficult to produce and, consequently, relatively expensive.

As a result, a need exists for a simple and inexpensive way to manipulate sidebands in WGM modulators. More specifically, a need exists for the suppression of high-order harmonics, filtering, and conversion of phase to amplitude modulation in WGM modulators.

SUMMARY OF THE INVENTION

The present teachings disclose a WGM resonator device and methods that can filter sidebands of modulators.

According to an embodiment, a device includes providing an optical resonator adapted to support whispering gallery modes and forming a first field and a second field at a first location and a second location, respectively, on or in vicinity of a circumference of the optical resonator. The first location can be separated from the second location by a user-selectable arc angle, $\alpha$. The first field and the second field can each include a first mode and a second mode. The method further includes adjusting relative phase between the first field and the second field in accordance to a user-selectable differential phase, $\beta$. The method also can include combining the first and the second fields into an output.

According to a further embodiment, a device includes an optical resonator capable of supporting whispering gallery modes. The optical resonator can include a carrier signal having an orbital number, L, with, L, nodes around a circumference of the optical resonator, and a sideband signal having an orbital number, L plus $\Delta L$. The device can further include a first coupler arranged at a first location on or in vicinity of the circumference of the optical resonator and configured to provide a first combined signal including the carrier signal and the sideband signal. The device can also include a second coupler arranged at a second location on or in vicinity of the circumference of the optical resonator and separated from the first location by an arc angle, $\alpha$, and configured to provide a second combined signal including the carrier signal and the sideband signal. A combiner can be arranged to receive the first combined signal and the second combined signal. The combiner can be configured to adjust a relative phase between the first combined signal and the second combined signal according to a differential phase, $\beta$, and to combine the first combined signal and the second combined signal into an output. A phase difference of the carrier signal between the first location and the second location can be governed by: $\phi = \alpha L$. The phase difference of the sideband signal between the first location and the second location can be: $\phi + \alpha \Delta L$.

According to a still further embodiment, a method includes providing an optical resonator adapted to support whispering gallery modes. The optical resonator can include a carrier signal having an orbital number, L, with, L, nodes around a circumference of the optical resonator, wherein phase difference of the carrier signal between a first location and any one of, n, locations on the circumference of the optical resonator separated by a user-selected arc angle, $\alpha_n$, can be respectively governed by: $\phi_n = \alpha_n L$. The optical resonator can also include m sideband signals each having an orbital number, L plus $m\Delta L$, wherein phase difference of each of the sideband signals between the first location and any one of the n locations can be $\phi_n + m\Delta L$, respectively. The method can further include forming, n, joint signals of the carrier and the sideband signals corresponding to each of the, n, locations. The method can still further include adjusting phase of each of the, n, joint signals in accordance to, n, differential phase, $\beta_n$. The method can also include selectively combining any combination of the, n, joint signals into at least one output.

According to yet another embodiment, a method includes providing an optical resonator adapted to support whispering gallery modes. The optical resonator can include a first mode having an orbital number, L, with, L, nodes around a circumference of the optical resonator. Phase difference of a field of the first mode between a first location and a second location on a circumference of the optical resonator separated by a user-selected arc angle, $\alpha$, can be governed by: $\phi = \alpha L$. A second mode can have an orbital number, L plus $\Delta L$, wherein phase difference of a field of the second mode between the first location and the second location can be: $\phi+\alpha\Delta L$. The method can further include forming a first combined field including the fields of the first mode and the second mode at the first location. The method can still further include forming a second combined field including the fields of the first mode and the second mode at the second location. The method can also include adjusting relative phase between the first combined field and the second combined field in accordance to a user-selected differential phase, $\beta$. The method can also include combining the first and the second combined fields into an output.

Additional features and advantages of various embodiments will be set forth, in part, in the description that follows, and, in part, will be apparent from the description, or may be learned by practice of various embodiments. The objectives and other advantages of various embodiments will be realized and attained by means of the elements and combinations particularly pointed out in the description herein.

BRIEF DESCRIPTION OF THE DRAWINGS

FIGS. 1-3 illustrate various exemplary resonator configurations that support whispering gallery modes and that can be implemented with the present teachings;

FIGS. 4A and 4B illustrate two exemplary evanescent couplers for a WGM resonator that can be used with the present teachings;

It is to be understood that both the foregoing general description and the following detailed description are exemplary and explanatory only, and are intended to provide an explanation of various embodiments of the present teachings.

DESCRIPTION OF THE INVENTION

The present teachings are directed to a phased-array optical whispering gallery mode (WGM) modulator, and a method of manipulating sidebands in such WGM modulators. A unique property of optical WGM resonators allows them to manipulate sidebands in WGM modulators. This unique property is the well-defined orbital number of a whispering gallery mode, which rigidly connects the phase variation of a field in the WGM resonator with the azimuthal angle between a pair of coupling locations on or in the vicinity of the WGM resonator. The present teachings relate to the application of a phased-array or a synthetic aperture technique to WGM modulators. The present teachings can thereby dramatically expand the range of applications for WGM resonators.

Figure 1:
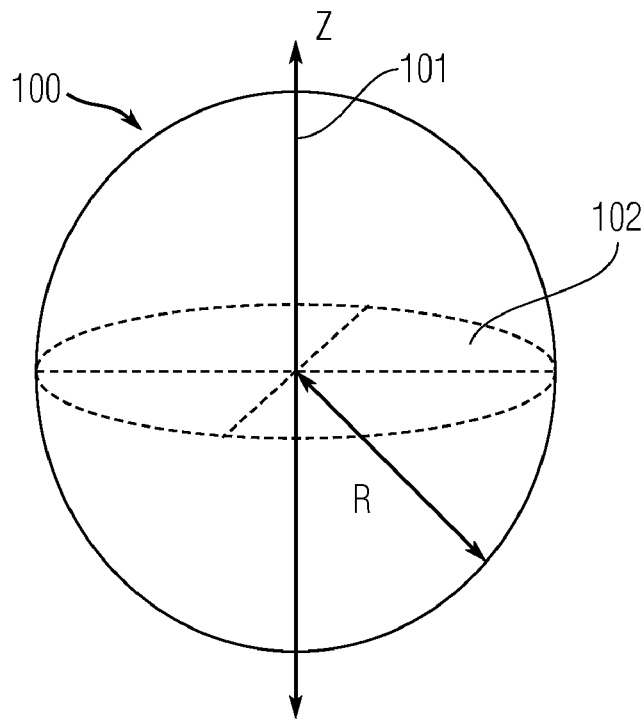
Figure 2:
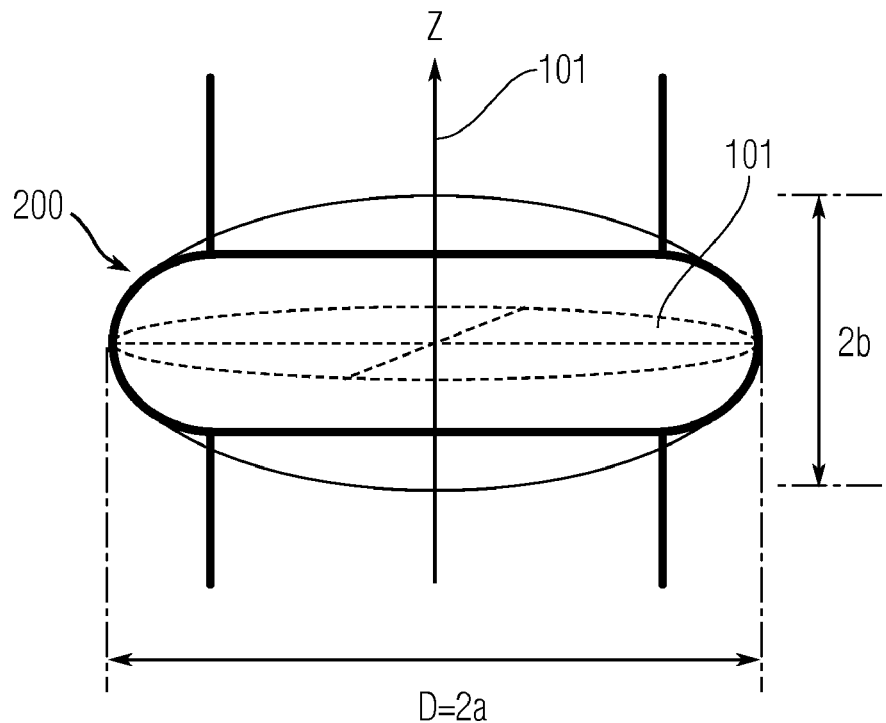

FIGS. 1-3 show several exemplary geometries for the implementation of the manipulation of sidebands in WGM modulators according to the present teachings. Referring to FIG. 1, a spherical WGM resonator 100 is shown as a solid dielectric sphere. The sphere 100 has an equatorial plane 102 which is symmetric around a z-axis 101. A whispering gallery mode exists around the equator within the spherical exterior surface and circulates within the WGM resonator 100. The spherical curvature of the exterior surface around the equatorial plane 102 provides spatial confinement along both the z-direction and its perpendicular direction and supports the whispering gallery modes. The eccentricity of the spherical WGM resonator 100 can be arranged to be generally low.

FIG. 2 shows an exemplary spheroidal micro-resonator 200 formed from optical material. This micro-resonator 200 can be formed by revolving an ellipse (having axial lengths, a and b) around the symmetric axis along the short elliptical axis 101, the z-axis. The eccentricity of the resonator 100 can be defined as: $(1-b^2/a^2)^{1/2}$, and can be characterized as being generally high, e.g., greater than $10^{-1}$. Hence, the exterior surface of the resonator 200 is not part of a sphere and provides more spatial confinement on the modes along the z-direction than a spherical exterior. The equatorial plane 102 at the center of the resonator 200 is perpendicular to the short elliptical axis 101 (the z-axis) and the whispering gallery modes circulate near the circumference of the equatorial plane 102 within the micro-resonator 200.

FIG. 3 shows another exemplary WGM resonator 300 which has a non-spherical exterior where the exterior profile is a general conic shape which can be mathematically represented by a quadratic equation of the Cartesian coordinates. Similar to the geometries in FIGS. 1 and 2, the exterior surface provides curvatures in both the direction in the equatorial plane 102 and the direction of the z-axis 101, perpendicular to the equatorial plane 102, to confine and support the whispering gallery modes. Such a non-spherical, non-elliptical surface can be, among others, a parabola or hyperbola.

The above three exemplary geometries in FIGS. 1, 2, and 3 share a common geometrical feature in that they are all axially or cylindrically symmetric around the elliptical axis 101 (z-direction) around which the whispering gallery modes circulate in the equatorial plane 102. The curved exterior surface is smooth around the equatorial plane 102 and provides two-dimensional confinement around this plane in order to support the whispering gallery modes.

Notably, the spatial extent of the whispering gallery modes in each resonator along the z-direction 101 is limited above and below the plane 102, and hence it may not be necessary to include the entirety of the sphere 100, the spheroid 200, or the conical shape 300, of FIG. 1, 2, or 3, respectively. Instead, only a portion of the entire shape around the equatorial plane 102 that is sufficiently large to support the whispering gallery modes may be used to form the WGM resonator. For example, rings, disks, or other geometries formed from a proper section of a sphere may be used as a spherical WGM resonator according to the present teachings.

An optical coupler can be used to couple optical energy into or out of a WGM resonator by way of evanescent coupling in the present teachings. FIGS. 4A and 4B show two exemplary optical couplers 104, 108, respectively, engaged to a WGM resonator 102. The optical couplers 104, 108 may be in direct contact with, or separated by a gap from, an exterior surface of the WGM resonator 102 to effectuate the desired critical coupling. FIG. 4A shows an angle-polished fiber tip 106 as a coupler 104 for the WGM resonator 102. FIG. 4B shows a micro-prism as a coupler 108 for the WGM resonator 102. Other evanescent couplers, such as a coupler formed from a photonic bandgap material, can be used. A single optical coupler can be used to couple one or more input signals into the WGM resonator 102. Optical coupling of an output signal from the WGM resonator can be achieved by sharing an input coupler or by using a designated output coupler.

A whispering gallery mode having an orbital momentum, L, has exactly, L, instant nodes around the circumference of the WGM resonator supporting such a mode. As a result, a phase difference of such a field between two locations located on or in the vicinity of the circumference of the WGM resonator and separated by an arc, $\alpha$, will be equal to $\phi=\alpha L$. According to the present teachings, this unique property can be employed to construct a combined field, from the fields of these two locations, that exhibit complete constructive or destructive inference, or any situation inbetween, depending on the angle, α. Preferably, the combination of the fields can be performed by an interferometer that has at least two interferometer arms. More preferably, the interferometer arms can be adjusted to any interferometer arm difference, β.

Figure 5:
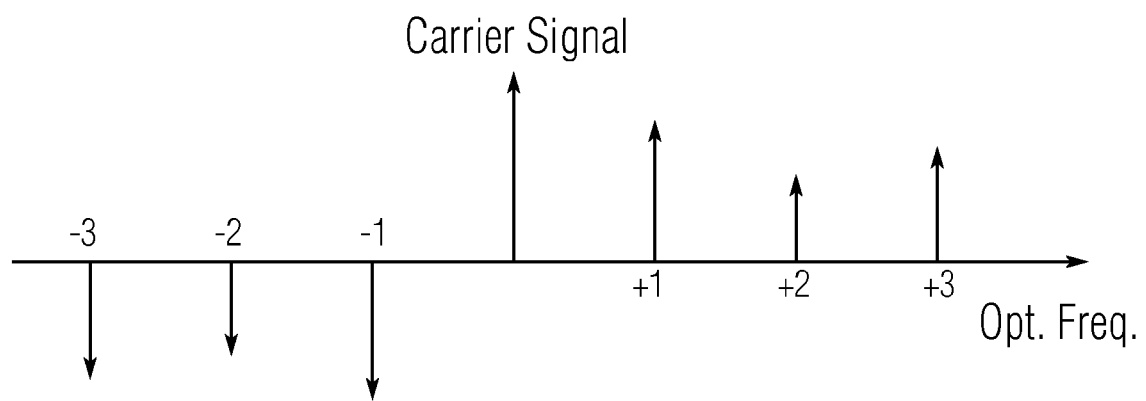
FIG. 5 illustrates a phase and amplitude relationship of an optical carrier and sidebands.

According to the present teachings and in a similar manner, a whispering gallery mode having an orbital momentum, L+ΔL, will exhibit a phase difference of, φ+αΔL. In all applications of a WGM resonator used as a modulator, the orbital numbers for the carrier and sidebands are different, and their differences, ΔL, are known. Generally, but not necessarily, ΔL=1, but could be equal to any other integer. For example, referring to FIG. 5, phase modulation of an optical carrier introduces many sidebands, each having a certain phase and amplitude relationship with the carrier and with each other. Although these sidebands beat with the carrier and beat with each other, they produce no amplitude modulations. This occurs because for each beat signal there always exists another beat signal which has the same amplitude and frequency but opposite phase. As a result, they can cancel each other out perfectly. Conversion of phase modulation to amplitude modulation requires the breakdown of the perfect amplitude balance of the sidebands.

In accordance with the present teachings, a user's selection of the angle, α, and of the interferometer arm difference, β, allows control of the relative phase between different modes, and thus, facilitates the phase/amplitude modulation conversion, separation and filtering tasks.

Figure 6:
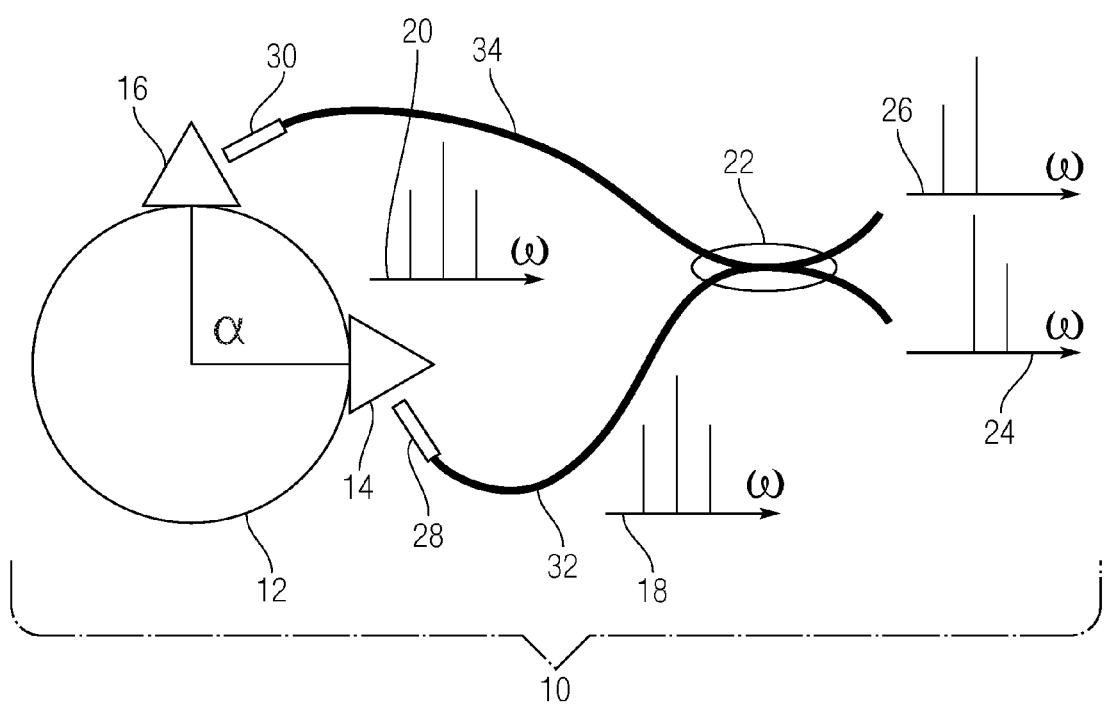
FIG. 6 illustrates an exemplary device according to the present teachings.

FIG. 6 illustrates the elements of a device 10 according to the present teachings. Disposed at an arc angle, α, around a circumference of a WGM resonator 12, are a first prism coupler 14 and second prism coupler 16. In general, various modes of the WGM resonator 12 can be coupled out by the prism couplers 14 and 16, onto collimators 28 and 30, where they can be collimated and transferred onto fibers 32 and 34, respectively. Outputs from the fibers 32 and 34 preferably can be combined by an interferometer 22 in accordance to an interferometer arm difference, β.

Still referring to FIG. 6, the device 10 of the present teachings can be configured as a SSB modulator by having the user set the arc angle, α, equal to, π/2, and balancing the interferometer 22 so that one of the sidebands becomes completely dark. A double sideband signal 18 is coupled out by the first prism coupler 14, while a second double sideband signal 20 is coupled out by the second prism coupler 16, which is separated from the first prism coupler 14 by an angle of π/2. These signals can be combined by the interferometer 22 with a 50/50 beam splitter that produces SSB outputs 24 and 26, where each of the outputs has one of the sidebands eliminated. In this case, ΔL, is equal to 1.

The device 10 of the present teachings can also be configured as a phase-to-amplitude modulator converter. In such a configuration, the arc angle, α, is set to, π/2, while the interferometer arm difference, β, is also set to, π/2, so that each sideband is equally split between the outputs of the interferometer 22.

In accordance with the present teachings, functions involving manipulation of multiple harmonics can also be implemented when more than two couplers are utilized. According to an embodiment, the device 10 can provide, n, joint signals of a carrier signal and, m, sideband signals, corresponding to each of the, n, locations of the couplers arranged on or in the vicinity of the circumference of the WGM resonator 12, separated by an arc angle, $α_n$. Furthermore, the interferometer 22 can selectively combine any combination of n signals into at least one output, in accordance to, n, interferometer arm differences, $β_n$. A user's choice of the angles, $α_n$, and of the interferometer arm differences, $β_n$, allows control of the relative phase between different modes, and thus, facilitates the phase/amplitude modulation conversion, separation, and filtering tasks for multiple harmonics.

The optical modulation and filtering achieved by the device and method of the present teachings provides great advantages compared to WGM optical resonators that have nonlinear optical materials in multiple sectors. Being constructed from a single crystal wafer rather than multiple crystals with alternating directions of the crystal axis reduces fabrication complexity and, consequently, reduces cost. Accordingly, application of phased-array or synthetic aperture technique to WGM modulators can be used to provide a simple and efficient way of SSB modulation, phase/amplitude modulation conversion, and filtering. The present teachings can enhance the capabilities and expand the applications of one of the most compact and power-efficient high-speed modulators, a WGM resonator.

While the invention has been particularly shown and described with reference to specific preferred embodiments, it should be understood by those skilled in the art that various changes in form and detail may be made therein without departing from the spirit and scope of the present teachings as defined by the appended claims.

What is claimed is:

1. A method comprising:
   providing an optical resonator adapted to support whispering gallery modes;
   forming a first field and a second field at a first location and a second location, respectively, on or in vicinity of a circumference of the optical resonator, the first location being separated from the second location by a user-selectable arc angle, α, and the first field and the second field each including a first mode and a second mode;
   adjusting a relative phase between the first field and the second field in accordance to a user-selectable differential phase, β; and
   combining the first and the second fields into an output.

2. The method of claim 1, wherein the first mode has an orbital number, L, and the second mode has an orbital number, L plus ΔL, and a phase difference of the first mode between the first location and the second location is governed by:

$$φ=αL, \text{ and}$$

a phase difference of the second mode between the first location and the second location is: φ+αΔL.

3. The method of claim 2, wherein the first mode is a carrier signal and the second mode is a phase-modulated sideband signal, and the user-selectable arc angle, α, and the user-selectable differential phase, β, result in the output being an amplitude modulated sideband signal.

4. The method of claim 2, wherein the first mode is a carrier signal and the second mode is a double sideband signal, and the user-selectable arc angle, α, and the user-selectable differential phase, β, result in the output being a single sideband signal.

5. The method of claim 2, wherein ΔL is an integer equal to or greater than 1.

6. The method of claim 3, wherein the user-selectable arc angle, α, is equal to π/2, the user-selectable differential phase, β, is equal to zero, and ΔL is equal to 1 resulting in the output being the amplitude modulated sideband signal.

7. The method of claim 4, wherein the user-selectable arc angle, α, is equal to π/2, the user-selectable differential phase, $\beta$, is equal to $\pi/2$, and $\Delta L$ is equal to 1 resulting in the output being the single sideband signal.

8. The method of claim 1, wherein the adjusting and the combining is performed by an interferometer having a first interferometer arm and a second interferometer arm, and wherein the user-selectable differential phase, $\beta$, is controlled by an arm difference between the first interferometer arm and the second interferometer arm.

9. A device comprising:
   an optical resonator capable of supporting whispering gallery modes, the optical resonator including a carrier signal having an orbital number, L, with, L, nodes around a circumference of the optical resonator, and a sideband signal having an orbital number, L plus $\Delta L$;
   a first coupler arranged at a first location on or in vicinity of the circumference of the optical resonator and configured to provide a first combined signal including the carrier signal and the sideband signal;
   a second coupler arranged at a second location on or in vicinity of the circumference of the optical resonator and separated from the first location by an arc angle, $\alpha$, and configured to provide a second combined signal including the carrier signal and the sideband signal; and
   a combiner arranged to receive the first combined signal and the second combined signal, the combiner configured to adjust a relative phase between the first combined signal and the second combined signal according to a differential phase, $\beta$, and to combine the first combined signal and the second combined signal into an output;
   wherein a phase difference of the carrier signal between the first location and the second location is governed by:

$\phi = \alpha L$, and wherein a phase difference of the sideband signal between the first location and the second location is: $\phi = \alpha \Delta L$.

10. The device of claim 9, wherein the combiner is an interferometer having a first interferometer arm and a second interferometer arm.

11. The device of claim 10, wherein the differential phase, $\beta$, is determined by an arm length difference between the first interferometer arm and the second interferometer arm.

12. The device of claim 9, wherein the optical resonator includes a portion of a sphere.

13. The device of claim 9, wherein the optical resonator has a non-spherical shape.

14. The device of claim 9, wherein the optical resonator has one of a disk shape, a ring shape, and a spheroidal shape.

15. The device of claim 9, wherein each of the first coupler and the second coupler are one of a prism and an angled tip fiber.

16. The device of claim 9, wherein the sideband signal is a phase-modulated sideband signal, and the arc angle, $\alpha$, and the differential phase, $\beta$, result in the output being an amplitude modulated sideband signal.

17. The device of claim 9, wherein the sideband signal is a double-sideband signal, and the arc angle, $\alpha$, and the differential phase, $\beta$, result in the output being a single sideband signal.

18. The device of claim 9, wherein $\Delta L$ is equal to 1 or an integer greater than 1.

19. A method comprising:
    providing an optical resonator adapted to support whispering gallery modes, the optical resonator including:
    a carder signal having an orbital number, L, with, L, nodes around a circumference of the optical resonator, wherein a phase difference of the carrier signal between a first location and any one of, n, locations on the circumference of the optical resonator separated by a user-selected are angle, $\alpha_n$, is respectively governed by:

$\phi_n = \alpha_n L$, and m sideband signals each having an orbital number, L plus $\Delta L$, wherein a phase difference of each of the sideband signals between the first location and any one of the n locations is $\phi_m + m\Delta L$, respectively;
    forming, n, joint signals of the carrier and the sideband signals corresponding to each of the, n, locations;
    adjusting a phase of each of the, n, joint signals in accordance to, n, differential phases, $\beta_n$; and
    selectively combining any combination of the, n, joint signals into at least one output.

20. The method of claim 19, wherein a particular selection of the arc angles, $\alpha_n$, and a particular selection of the differential phases, $\beta_n$, result in a combination of m sideband signals being filtered out at the at least one output.

21. A method comprising:
    providing an optical resonator adapted to support whispering gallery modes, the optical resonator comprising:
    a first mode having an orbital number, L, with, L, nodes around a circumference of the optical resonator, wherein a phase difference of a field of the first mode between a first location and a second location on a circumference of the optical resonator separated by a user-selected arc angle, $\alpha$, is governed by:

$\phi = \alpha L$, and a second mode having an orbital number, L plus $\Delta L$, wherein a phase difference of a field of the second mode between the first location and the second location is $\phi = \alpha \Delta L$;
    forming a first combined field including the fields of the first mode and the second mode at the first location;
    forming a second combined field including the fields of the first mode and the second mode at the second location;
    adjusting a relative phase between the first combined field and the second combined field in accordance to a user-selected differential phase, $\beta$, and
    combining the first and the second combined fields into an output.

* * * * *